(12) United States Patent
Vanneste et al.

(10) Patent No.: US 7,152,391 B2
(45) Date of Patent: Dec. 26, 2006

(54) STEEL CORD FOR REINFORCING OFF-THE-ROAD TIRES AND CONVEYOR BELTS

(75) Inventors: Stijn Vanneste, Ingelmunster (BE); Steven Wostyn, Desselgem (BE); Niko De Rore, Lendelede (BE); Dirk Meersschaut, Ooigem (BE)

(73) Assignee: NV Bekaert SA, Zwevegem (BE)

( * ) Notice: Subject to any disclaimer, the term of this patent is extended or adjusted under 35 U.S.C. 154(b) by 403 days.

(21) Appl. No.: 10/432,332

(22) PCT Filed: Nov. 20, 2001

(86) PCT No.: PCT/EP01/13547

§ 371 (c)(1),
(2), (4) Date: May 22, 2003

(87) PCT Pub. No.: WO02/44464

PCT Pub. Date: Jun. 6, 2002

(65) Prior Publication Data

US 2004/0045652 A1    Mar. 11, 2004

(30) Foreign Application Priority Data

Dec. 1, 2000   (EP) .................................. 00204305

(51) Int. Cl.
*D02G 3/02*   (2006.01)

(52) U.S. Cl. .......................................... 57/237; 57/241
(58) Field of Classification Search .......... 57/212–214, 57/217, 218, 221, 223, 231, 232, 237, 241, 57/902; 152/451, 527, 556
See application file for complete search history.

(56) References Cited

U.S. PATENT DOCUMENTS

| | | | |
|---|---|---|---|
| 6,276,120 B1* | 8/2001 | Adriaensen et al. | 57/210 |
| 6,334,293 B1* | 1/2002 | Poethke et al. | 57/210 |
| 2002/0053386 A1* | 5/2002 | Hirachi et al. | 152/529 |
| 2005/0037197 A1* | 2/2005 | Vanneste et al. | 428/375 |
| 2005/0121126 A1* | 6/2005 | Hirachi et al. | 152/451 |

FOREIGN PATENT DOCUMENTS

| | | |
|---|---|---|
| DE | 1 510 065 | 12/1969 |
| GB | 1100686 | 1/1968 |
| WO | WO 99/31313 A1 | 6/1999 |

* cited by examiner

*Primary Examiner*—Shaun R. Hurley
(74) *Attorney, Agent, or Firm*—Foley & Lardner LLP

(57) ABSTRACT

A steel cord comprises a metal core strand and adjacent layer of steel elements. Between the metal core strand and adjacent layer of steel elements, a polymer layer with a minimum thickness of more than 0.02 mm is provided. These steel cords are to be used to reinforce off-the-road tires or conveyor belts.

7 Claims, 5 Drawing Sheets

STEEL CORD FOR REINFORCING OFF-THE-ROAD TIRES AND CONVEYOR BELTS

FIELD OF THE INVENTION

The present invention relates to steel cords, and more in particular to steel cords adapted to be used to reinforce rubber tires, especially off-the-road tires and conveyor belts.

BACKGROUND OF THE INVENTION

In steel cord applications for rubber reinforcement in general, there is a tendency to the use of higher tensile strength cords, making use of higher tensile strength steel filaments.

For off-the-road tires and conveyor belts, a steel cord comprising different layers of steel elements are used. One or more layers of steel elements surround a steel cord, which is called "metal core strand". These steel elements may be steel cords or strands, so providing e.g. a typical off-the-road steel cord construction 7×(3+9). The elements may also be steel filaments, so providing concentric layered cords, e.g. 3+9+15.

The use of high tensile strength steel filaments for these types of steel cord have, however, a disadvantage. A higher loss of tensile strength is noticed due to the twisting step or steps during transformation of the steel filaments into stands, multi-strands or concentric layered cords, when such high tensile strength steel filaments are used. When strands, multi-layered strands or concentric layered cords are subjected to an axial load, the different filaments of these strands or cords exercise radial forces to each other. They, so-to-say clamp each other. It was found that the higher the tensile strength of the filament, the larger the loss of tensile strength under simultaneous radial and axial load.

This explains the fact that the higher the tensile strength of the filament, the larger the loss of tensile strength due to the twisting steps used to transform the filaments into a strand or concentric layered cord. Further, the more complex the construction of the multi-strands or concentric layered cords, the larger the loss of tensile strength. Especially when the twisting directions of the different layers are different. E.g. a metal core strand twisted in Z-direction, a first layer of steel filaments twisted around this metal core strand in S-direction and a second layer twisted around both underlying layer and metal core strand again in Z-direction.

As a result, the use of high tensile strength steel filaments usually result in moderate or normal levels of tensile strength and breaking load of the provided steel cord or strand, whereas the use of high tensile strength steel elements would suggest higher tensile strengths and breaking loads for the steel cord or strand.

An attempt to reduce this loss of tensile strength has been made by providing steel cords comprising high tensile strength steel filaments, which allow full rubber penetration. However, the results were not fully adequate.

SUMMARY OF THE INVENTION

The object of the invention is to reduce the loss of tensile strength or breaking load of high tensile steel cords, adapted to be used to reinforce rubber tires, especially off-the-road tires, or conveyor belts.

A steel cord, according to the present invention, comprises one or more layers of steel elements twisted round a metal core strand. These steel elements may be steel filaments, or steel strands. One or more layers of steel elements may be twisted around the metal core strand, using the same or a different twisting direction and/or angle. Different steel filament diameters or strand constructions may be used to provide the steel cord as subject of the invention. The steel cord as subject of the invention may be a so-called compact cord, a multi-strand construction or a concentric layered construction.

A steel cord according to the present invention is characterized in that a layer of polymer material is provided between the metal core strand and at least one layer of steel elements, which is twisted around this metal core strand, wherein the thickness of the polymer material is more than 0.02 mm.

Filaments which are used to provide the different steel elements of the steel cord as subject of the invention preferably have a tensile strength larger than 2000 N/mm$^2$, preferably more than 2500 N/mm$^2$ and most preferably more than 2800 N/mm$^2$.

Diameters of the filaments which are used to provide the different steel elements of the steel cord as subject of the invention are less than 0.8 mm, preferably between 0.15 and 0.6 mm, most preferably between 0.175 and 0.35 mm.

A steel cord according to the present invention is characterized in that a layer of polymer material is provided between the metal core strand and at least one layer of steel elements, which is twisted around this metal core strand. This layer of polymer material separates the metal core strand and the adjacent layer of steel elements from each other. The polymer layer prevents to a large extent the existence of contacts and contact points between the filaments of the metal core strand and filaments of the adjacent layer of steel elements. The minimum thickness of the polymer layer between metal core strand and adjacent layer of steel elements is to be more than 0.02 mm, preferably more than 0.035 mm, most preferably more than 0.05 mm., e.g. more than 0.1 mm.

This minimum thickness is measured through following procedure:

- The cord is radially cut on at least 5 different places, the cut edges are polished and the cross sections of the cord are photographed;
- For each cross section, the minimum distance between metal core strand and each steel element of the layer of steel elements is measured. This is done by measuring the distance between the filament of the steel element, which is closest to the metal core strand, and the filament of the metal core strand, which is closest to the steel element. An average distance is calculated of these minimum distances;
- The minimum thickness of the polymer layer is calculated as the average of at least 5 average distances, resulting out of at least 5 different radial cross sections.

Such minimum thickness is obtainable by providing a layer of polymer material around the metal core strand, before the adjacent layer of steel elements is twisted around this core layer. To obtain best results, the minimum thickness of the polymer layer, provided around the metal core strand before twisting the adjacent layer of steel elements is minimum 0.05 mm, most preferably more than 0.1 mm. The thickness is measured as the optical diameter difference coated/non coated strand or filament, divided by 2. A smaller thickness of the polymer layer before twisting the adjacent layer of steel elements results in frequent local contact points between metal core strand and adjacent steel elements, which is probably caused by the specific diameters of the filaments used. One may assume, without having a proven theory supporting this assumption, that when thinner layers of polymer material is used, the fine filaments used to provide the adjacent layer or the strands, present in the adjacent layers may cut through the polymer layer during twisting of the steel cord as subject of the invention. During twisting, the adjacent steel elements move radial inwards, towards the metal core strand. The steel elements are so-to-say pressed in the polymer layer. When the layer is too thin before twisting the adjacent layer of steel elements, the polymer layer may be locally pushed away, or so-to-say 'cut' by the high local radial stresses upon the polymer layer.

Preferably, the adjacent layer of steel elements is twisted around the metal core strand in the opposite direction of the twisting direction of the metal core strand. When the metal core strand has a 'S'-twisting direction, the adjacent layer of steel elements preferably are twisted around the metal core strand in 'Z'-direction, after providing a polymer layer round the core layer. Such steel cord constructions benefits most from the improvement of breaking load and tensile strength due to the application of the polymer material, as subject of the invention.

It is clear that the polymer layer may not be too thick neither. A too thick layer of polymer material between metal core strand and adjacent layer of steel elements would make the steel cord as subject of the invention unstable and not useful for the reinforcement of off-the-road tires and conveyor belts. Even more, a thick coating increases the cord diameter, so a thicker layer of rubber is required to embed the cords, which also increases the cost. The minimum polymer layer between metal core strand and adjacent layer of steel elements may not exceed 0.120 mm.

Steel cords as subject of the invention increases the breaking load of the steel cord with at least 3%, compared to a steel cord with identical construction and steel elements providing the steel cord, but without polymer layer. A breaking load increase of more than 5% may even be obtained.

Steel cords as subject of the invention with a breaking load more 1500 MPa or even more than 2000 MPa are preferred and benefits most from the reduction of tensile strength loss due to the twisting steps during construction of the steel cord.

Steel cords as subject of the invention preferably, but not restrictively have a construction known as 7×(3+9), 7×(3+9+15), 3+9+9×3, 7×7, 7×19 or 19+8×7.

Steel alloys used to provide steel cords as subject of the invention preferably have a carbon content between 0.70% and 1.10%, a manganese content between 0.40% and 0.70%, a silicon content between 0.10% and 0.40%, a maximum sulfur content of 0.03%, a maximum phosphorus content of 0.03%. Micro-alloying with particular elements such as chromium, nickel, vanadium, boron, cobalt, copper, molybdenum etc. is not excluded for amounts ranging from 0.01% to 0.50%.

Preferably a thermoplastic polymer material is used to provide the layer of polymer material, such as polyethylene terephthalate (PET), polyamide (PA), polyester (PES), polypropylene (PP), polyvinylchloride (PVC), polytetrafluoethylene (PTFE) or polyethylene (PB) or copolymers thereof. Preferably polyethylene terephthalate (PET) is used. The polymer material may be provided in different ways, however, preferably, the polymer material is extruded around the metal core strand.

A person skilled in the art understands that, when a steel cord as subject of the invention comprises a metal core strand and two or more layers of steel elements, according to the present invention different layers of polymer material may be provided between the different layers of steel elements. Around a metal core strand, which may consist on its own of a layered construction, a first layer of polymer material may be provided. One or more layers of steel elements are twisted around this metal core strand with polymer layer. A second layer may be provided around this combination of metal core strand, first layer of polymer material and adjacent layers of steel elements. Additional layers of steel elements are provided around this second layer of polymer material. Alternately, more layers of polymer material and steel elements may be provided. Identical thickness' of polymer material are to be used as described above.

The steel cords as subject of the invention may be used to reinforce off-the-road tires or conveyor belts. They combine the use of high tensile strength steel filaments, while compensating the loss of tensile strength and breaking load, due to the twisting operations.

BRIEF DESCRIPTION OF THE DRAWINGS

The invention will now be described into more detail with reference to the accompanying drawings wherein.

DESCRIPTION OF THE PREFERRED EMBODIMENTS OF THE INVENTION

Figure 1:
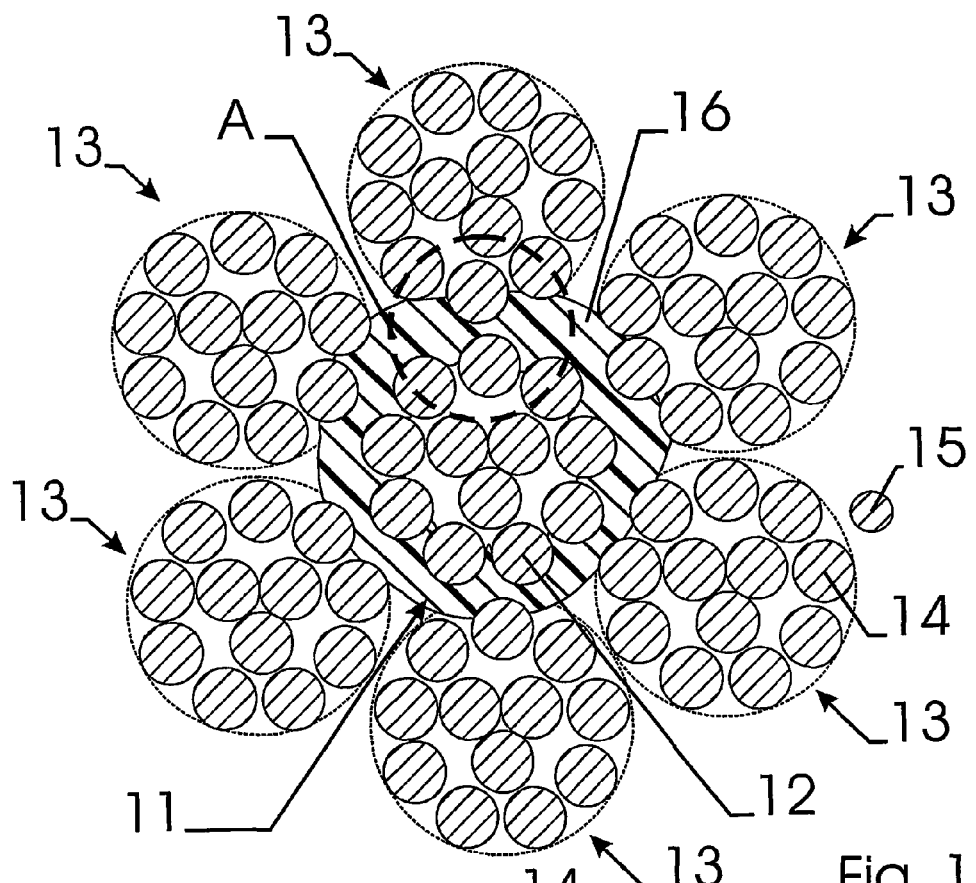
FIG. 1 shows schematically a cross section of a steel cord multi-strand construction according to the present invention

A preferred steel cord as subject of the invention is shown in FIG. 1, being a 7×(3+9)+1 construction. The steel cord comprises a metal core strand 11, comprising twelve steel filaments 12, being three steel filaments of a diameter 0.245, twisted in Z direction with a step 6.3, round which nine identical steel filaments 12 are twisted in Z direction with step 12.5. Six steel elements 13, comprising three steel filaments of a diameter 0.245, twisted in S direction with a step 6.3, round which nine identical steel filaments are twisted in S direction with step 12.5, are twisted around this metal core strand 11 with a laylength of 28 mm, so providing an adjacent layer of steel elements 13. Steel filaments comprised in these steel elements 13 are referred to hereafter as steel filaments 14. The steel cord as subject of the invention further comprises a binding filament 15, being 0.20 mm twisting around the metal core strand and layer of steel elements with a laylength of 5 mm in S direction. According to the present invention, a polymer layer 16 is provided between metal core strand 11 and steel elements 13. PET was used to provide a preferred embodiment.

A steel alloy comprising 0.82% C+0.5% Mn was used to provide all steel filaments 12 and 14.

Figure 2:
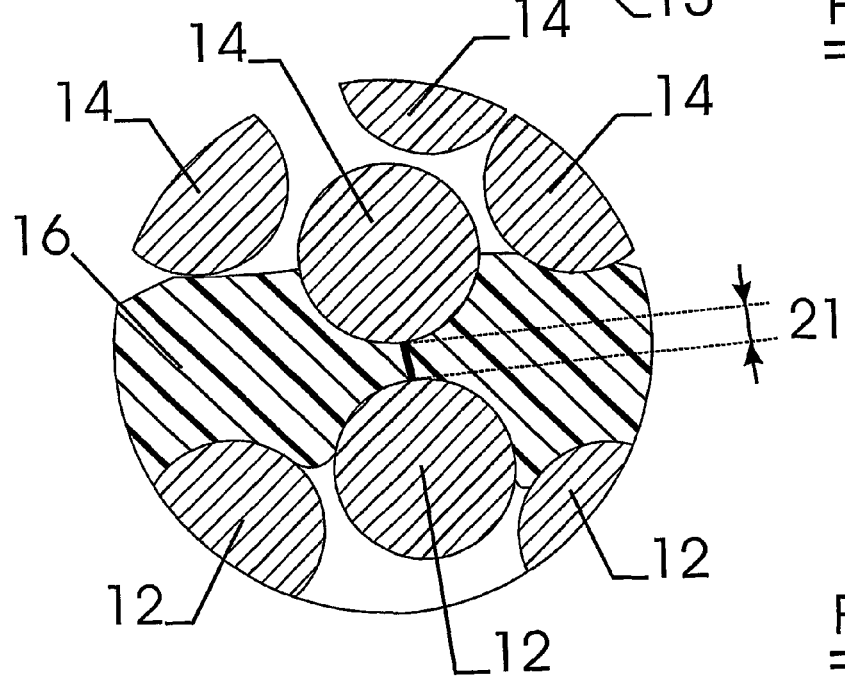
FIG. 2 is a detail of FIG. 1

Detail A of FIG. 1 is shown in FIG. 2. The minimum distance 21 between steel filaments 12 of the metal core strand and steel filaments 14 of the adjacent layer of steel elements, is measured as shown in FIG. 2. Such minimum distance 21 was measured for each steel element 13 of the adjacent layer of steel elements. For the embodiment of FIG. 1, the average distance is the average of the six minimum distances between the metal core strand 11 and each steel element 13. A minimum thickness was measured by making an average of at least 5 average distances of 5 different radial cross sections of the present embodiment of the invention.

Figure 3:
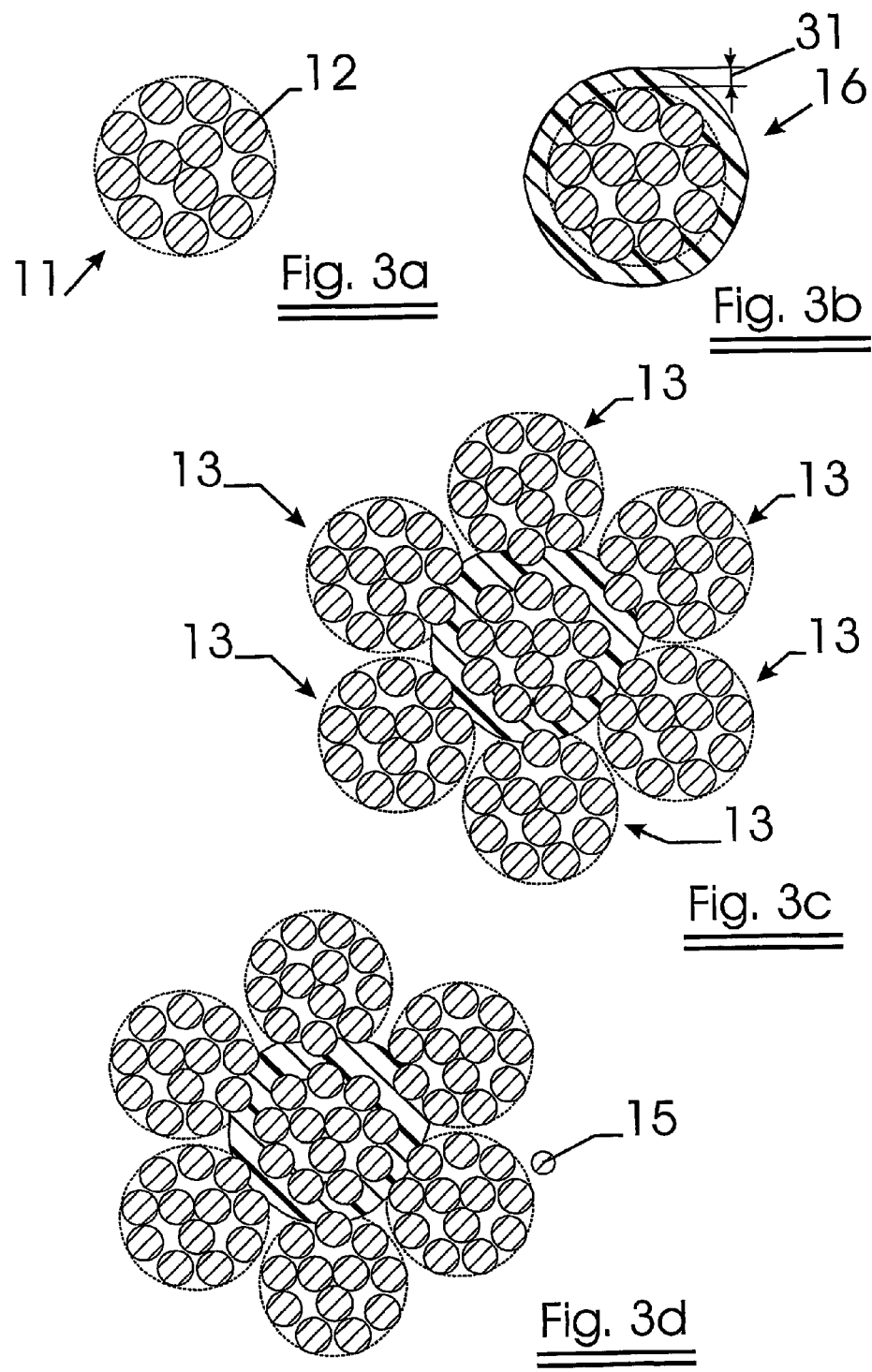
FIGS. 3a–3d show schematically the different steps to provide a steel cord construction as subject of the invention as shown in FIG. 1.

The embodiment as shown in FIG. 1 may be provided by the steps as shown in FIG. 3. A metal core strand (3+9), indicated in FIG. 3 as 11, is provided using known techniques during first step 3a. In a next step 3b, a polymer layer 16 is provided around this metal core strand 11. Preferably, this polymer layer is extruded around the metal core strand. The thickness of the polymer material 31 is preferably more than 0.05 mm, most preferably more than 0.11 mm. During the next step 3c, six steel elements 13, being (3+9) constructions are twisted around the polymer layer 16. Additionally, a wrapping filament 15 may be provided by step 3d.

Four different embodiments of the present invention, based on a 7×(3+9)+1 cord, having a different PET layer around the core stand (3+9) were compared with a reference 7×(3+9)+1 cord. As shown in table I underneath, the breaking load increased with more than 5% for the embodiments of the present invention.

TABLE I

| embodiment | Coating thickness | | Breaking load | |
|---|---|---|---|---|
| | on metal core strand before twisting layer of steel elements (mm) | Minimum thickness of polymer layer of cord as subject of the invention (mm) | Breaking load (N) | load-load ref/ load ref (%) |
| 7 × (3 + 9) + 1 (reference) | 0 | 0 | 10731 | 0% |
| 7 × (3 + 9) + 1 | 0.11 | 0.057 | 11356 | +5.8% |
| 7 × (3 + 9) + 1 | 0.11 | 0.038 | 11510 | +7.2% |
| 7 × (3 + 9) + 1 | 0.05 | 0.039 | 11253 | +4.9% |
| 7 × (3 + 9) + 1 | 0.05 | 0.049 | 11268 | +5.0% |

A person skilled in the art understands that similar results may be obtained by using different filament diameters, steel alloys and polymer material. Other constructions are shown in FIGS. 4 to 8.

Figure 4:
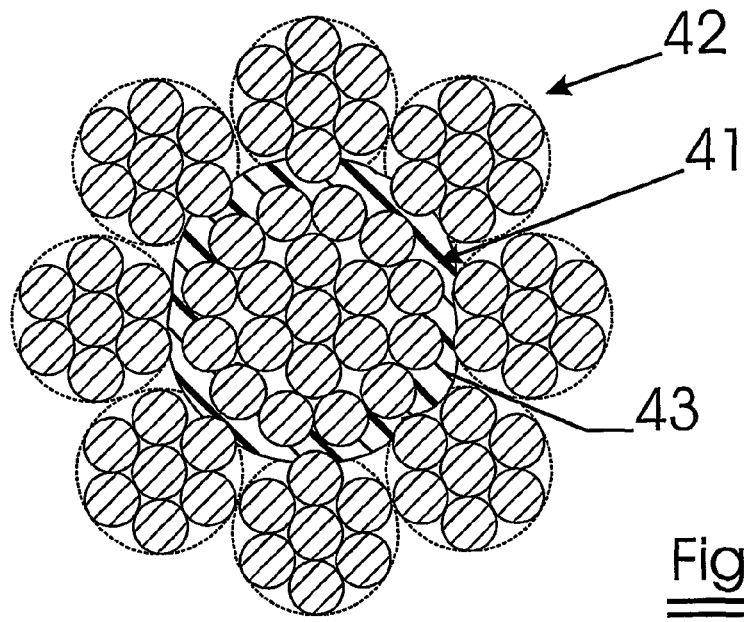
FIGS. 4 to 8c show schematically a cross section of alternative embodiments of steel cords as subject of the invention.

FIG. 4 shows schematically a radial cross section of a 19+(8×7) construction. A metal core strand 41, comprising nineteen steel filaments, is surrounded by a layer of eight steel elements 42, each steel element comprising 7 steel filaments. Between the metal core strand and the layer of steel elements, a layer of polymer material 43 is provided.

Figure 5:
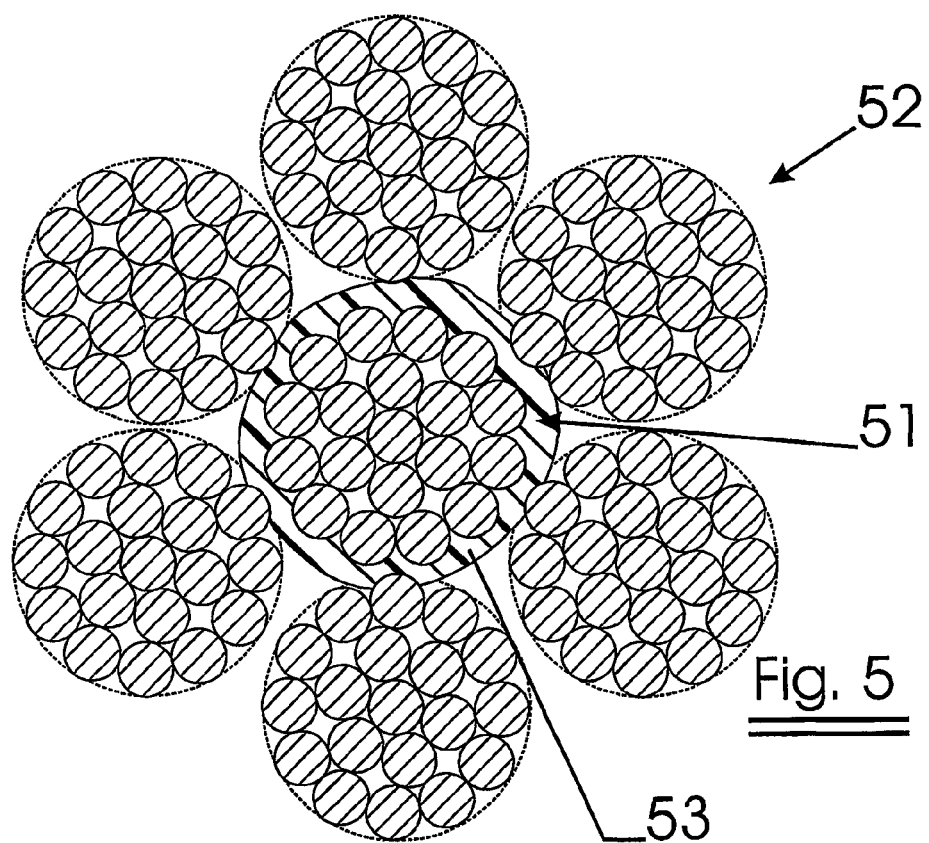

FIG. 5 shows schematically a radial cross section of a 7×19 construction. A metal core strand 51, comprising nineteen steel filaments, is surrounded by a layer of six steel elements 52, each steel element comprising 19 steel filaments. Between the metal core strand and the layer of steel elements, a layer of polymer material 53 is provided.

Figure 6:
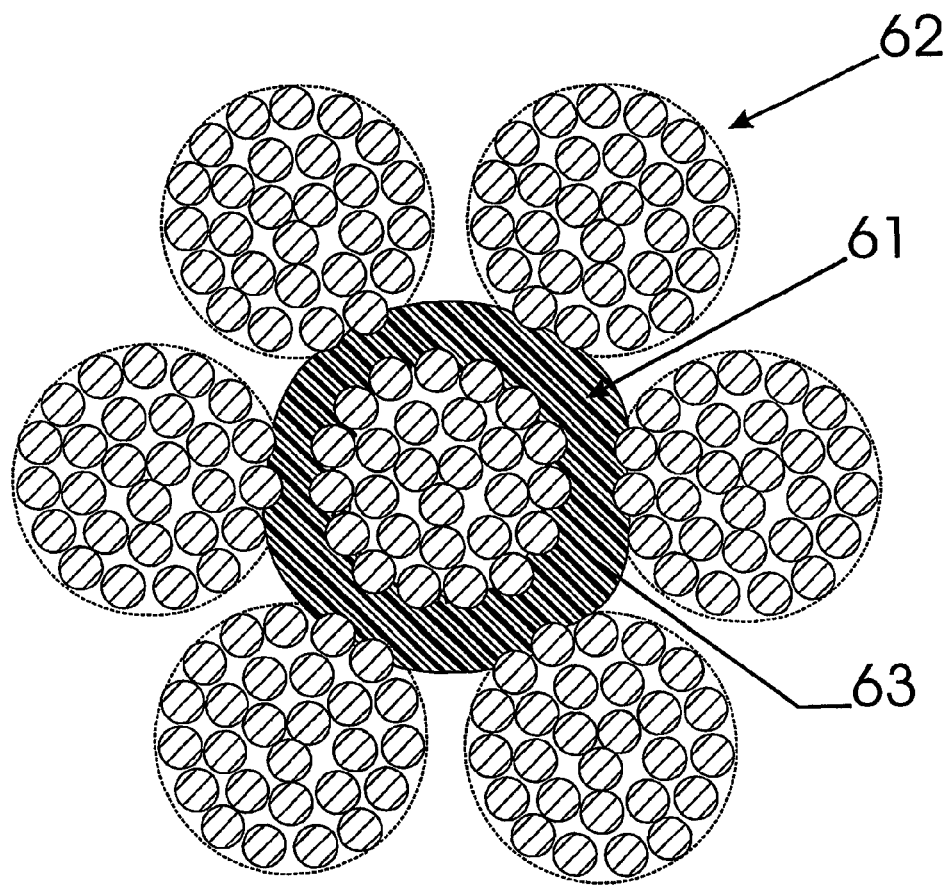

FIG. 6 shows schematically a radial cross section of a 7×(3+9+15) construction. A metal core strand 61, being a concentric layered cord of type (3+9+15), is surrounded by a layer of six steel elements 62, each steel element being a concentric layered cord of type (3+9+15). Between the metal core strand and the layer of steel elements, a layer of polymer material 63 is provided.

Figure 7:
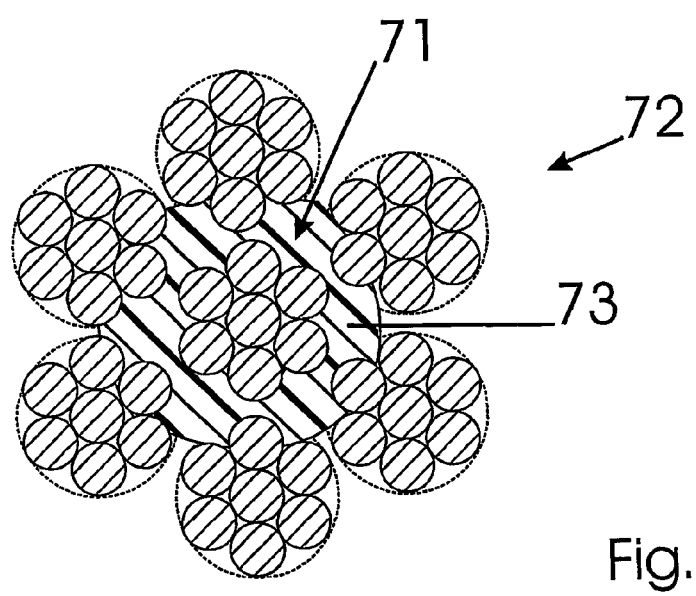

FIG. 7 shows schematically a radial cross section of a 7×7 construction. A metal core strand 71, comprising seven steel filaments, is surrounded by a layer of six steel elements 72, each steel element comprising seven steel filaments. Between the metal core strand and the layer of steel elements, a layer of polymer material 73 is provided.

Figure 8A:
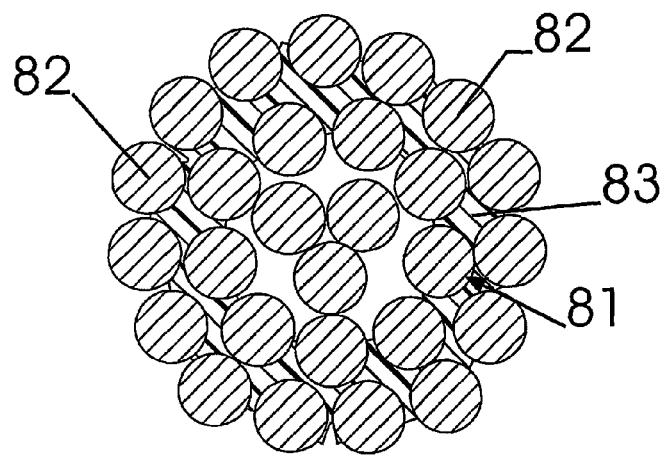
Figure 8B:
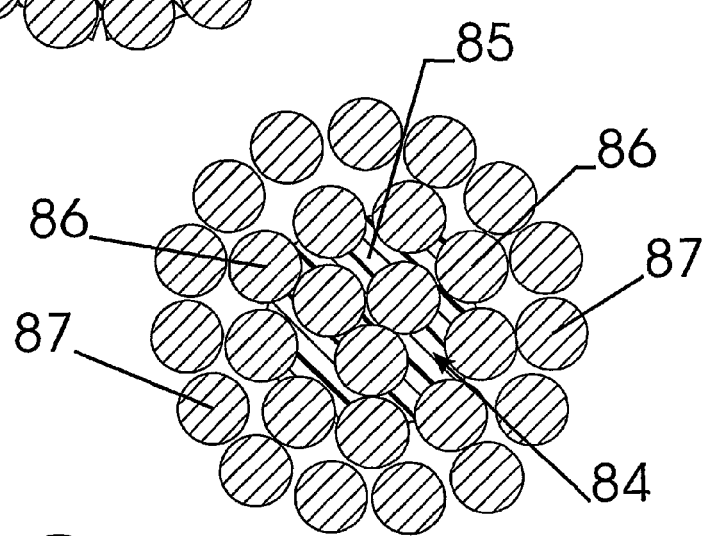
Figure 8C:
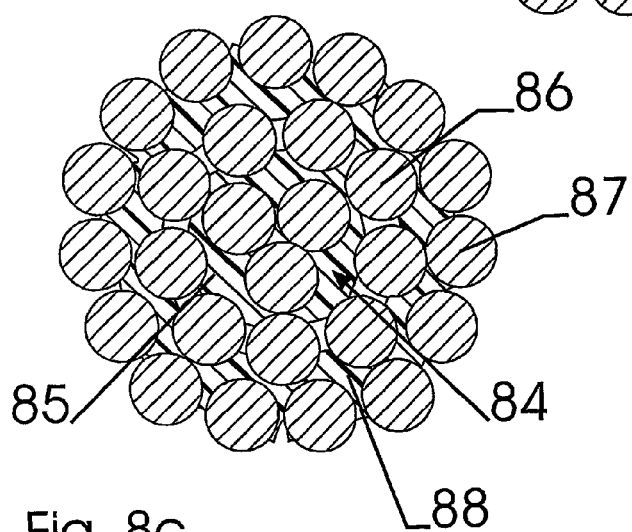

FIG. 8a shows schematically a concentric layered cord, having a metal core strand 81, being a cord of type (3+9), which is surrounded by a layer of fifteen steel elements 82, each steel element being a steel filament. Between the metal core strand and these fifteen filaments, a polymer layer 83 is provided. Alternatively, as shown in FIG. 8b, a metal core strand 84 of three filaments may be coated by a first polymer layer 85, after which a first layer of nine steel elements 86 is twisted around this coated metal core strand. A second layer of fifteen steel elements 87 surround this first layer of nine steel elements. A second layer of polymer material 88 may be provided between first layer of steel elements 86 and second layer of steel elements 87, as shown in FIG. 8c.

The invention is claimed is:

1. A steel cord to be used to reinforce rubber tires and/or conveyor belts, said steel cord comprising a metal core strand and at least one adjacent layer of steel elements twisted around said metal core strand, wherein said metal core strand is coated with a polymer material, said polymer material comprising a minimum thickness, said minimum thickness being more than 0.02 mm wherein the steel elements of the adjacent layer are pressed into the polymer material.

2. A steel cord as in claim 1, wherein said polymer material being thermoplastic polymer.

3. A steel cord as in claim 1, wherein said polymer material is polyethylene terephthalate.

4. A steel cord as in claim 1, wherein said minimum thickness is more than 0.035 mm.

5. A steel cord as in claim 1, wherein said steel elements providing said adjacent layer of steel elements are steel cords.

6. A steel cord as in claim 1, wherein said polymer material is extruded around said metal core strand.

7. A steel cord as in claim 1, wherein the polymer material is in the form of a layer, wherein the layer comprises the minimum thickness.

* * * * *